US012804087B2

(12) United States Patent
Takai

(10) Patent No.: US 12,804,087 B2
(45) Date of Patent: Nov. 17, 2026

(54) INFORMATION PROCESSING APPARATUS THAT DISPLAYS PREVIEW IMAGE ON DISPLAY DEVICE, AND IMAGE FORMING APPARATUS

(71) Applicant: KYOCERA Document Solutions Inc., Osaka (JP)

(72) Inventor: Kenji Takai, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 251 days.

(21) Appl. No.: 18/769,430

(22) Filed: Jul. 11, 2024

(65) Prior Publication Data

US 2025/0039314 A1 Jan. 30, 2025

(30) Foreign Application Priority Data

Jul. 19, 2023 (JP) ................................ 2023-117896

(51) Int. Cl.
*H04N 1/00* (2006.01)

(52) U.S. Cl.
CPC ....... *H04N 1/0044* (2013.01); *H04N 1/00469* (2013.01); *H04N 1/00496* (2013.01); *H04N 2201/0094* (2013.01)

(58) Field of Classification Search
None
See application file for complete search history.

(56) References Cited

U.S. PATENT DOCUMENTS

2012/0050161 A1* 3/2012 Andersson ............ G06F 1/1626 345/158
2015/0362989 A1* 12/2015 Tyagi ...................... G06F 3/017 345/156
2016/0071491 A1* 3/2016 Berryman ............ G06F 3/0418 345/173
2020/0344435 A1* 10/2020 Choi ..................... G06F 3/1454

FOREIGN PATENT DOCUMENTS

JP 2021100210 A 7/2021

* cited by examiner

*Primary Examiner* — Helen Zong
(74) *Attorney, Agent, or Firm* — IP Business Solutions, LLC.

(57) ABSTRACT

An image forming apparatus includes a rotary mechanism that allows a display device to rotate between a landscape orientation in which the long sides are opposed in an up-down direction, and a portrait orientation in which the short sides are opposed in the up-down direction, and a controller that displays a second preview screen, in which a preview image display region has been expanded, when the display device, displaying a first preview screen, has been shifted from the landscape orientation to the portrait orientation. When the display device is shifted from the portrait orientation to the landscape orientation, in a state where the second preview screen is displayed on the display device, and a job assigned with respect to image data corresponding to the second preview image is suspended, the controller displays a message urging inputting of an instruction on whether to resume the job, on the display device.

6 Claims, 15 Drawing Sheets

47
473
LANDSCAPE ORIENTATION

PORTRAIT ORIENTATION

LANDSCAPE ORIENTATION

INFORMATION PROCESSING APPARATUS THAT DISPLAYS PREVIEW IMAGE ON DISPLAY DEVICE, AND IMAGE FORMING APPARATUS

INCORPORATION BY REFERENCE

This application claims priority to Japanese Patent Application No. 2023-117896 filed on Jul. 19, 2023, the entire contents of which are incorporated by reference herein.

BACKGROUND

The present disclosure relates to an information processing apparatus and an image forming apparatus.

Some of existing information processing apparatuses, such as an image forming apparatus, include a display device of a rectangular shape having long sides and short sides, and mounted such that the display screen can be rotated to a portrait orientation and a landscape orientation. For example, an image forming apparatus has been proposed that includes the display device of a rectangular shape having long sides and short sides, and a rotary mechanism that rotates the display device to the landscape orientation in which the long sides are opposed in the up-down direction, and the portrait orientation in which the short sides are opposed in the up-down direction.

SUMMARY

The disclosure proposes further improvement of the foregoing techniques.

In an aspect, the disclosure provides an information processing apparatus including an operation device, a display device, a rotary mechanism, a sensor, and a control device. The operation device receives an instruction inputted by a user. The display device has a rectangular shape including long sides and short sides. The rotary mechanism allows the display device to rotate between a landscape orientation in which the long sides are opposed in an up-down direction, and a portrait orientation in which the short sides are opposed in the up-down direction. The sensor detects which of the landscape orientation and the portrait orientation the display device is assuming. The control device includes a processor, and acts as a controller when the processor executes a control program. The controller displays, on the display device, a first preview screen including a preview image display region for displaying a preview image of an image represented by image data, and displays the preview image in the preview image display region, such that edges of the preview image opposed in the up-down direction become parallel to the long side of the display device, when the landscape orientation of the display device is detected by the sensor. The controller displays a second preview screen, in which the preview image display region has been expanded, on the display device, when the sensor detects that the display device, displaying the first preview screen, has been shifted from the landscape orientation to the portrait orientation, displays the preview image in an enlarged size in accordance with the expansion, such that the edges of the preview image opposed in the up-down direction become parallel to the short side of the display device, displays, when the sensor detects that the display device, displaying the second preview screen, has been shifted from the portrait orientation to the landscape orientation, in a state where a job assigned with respect to the image data corresponding to the preview image is temporarily suspended, a message urging the user to input an instruction on whether to resume the job, resumes the job when the operation device receives a resumption instruction to resume the job, and keeps from resuming the job when the operation device receives a suspension instruction restricting resumption of the job.

DETAILED DESCRIPTION

Figure 1:
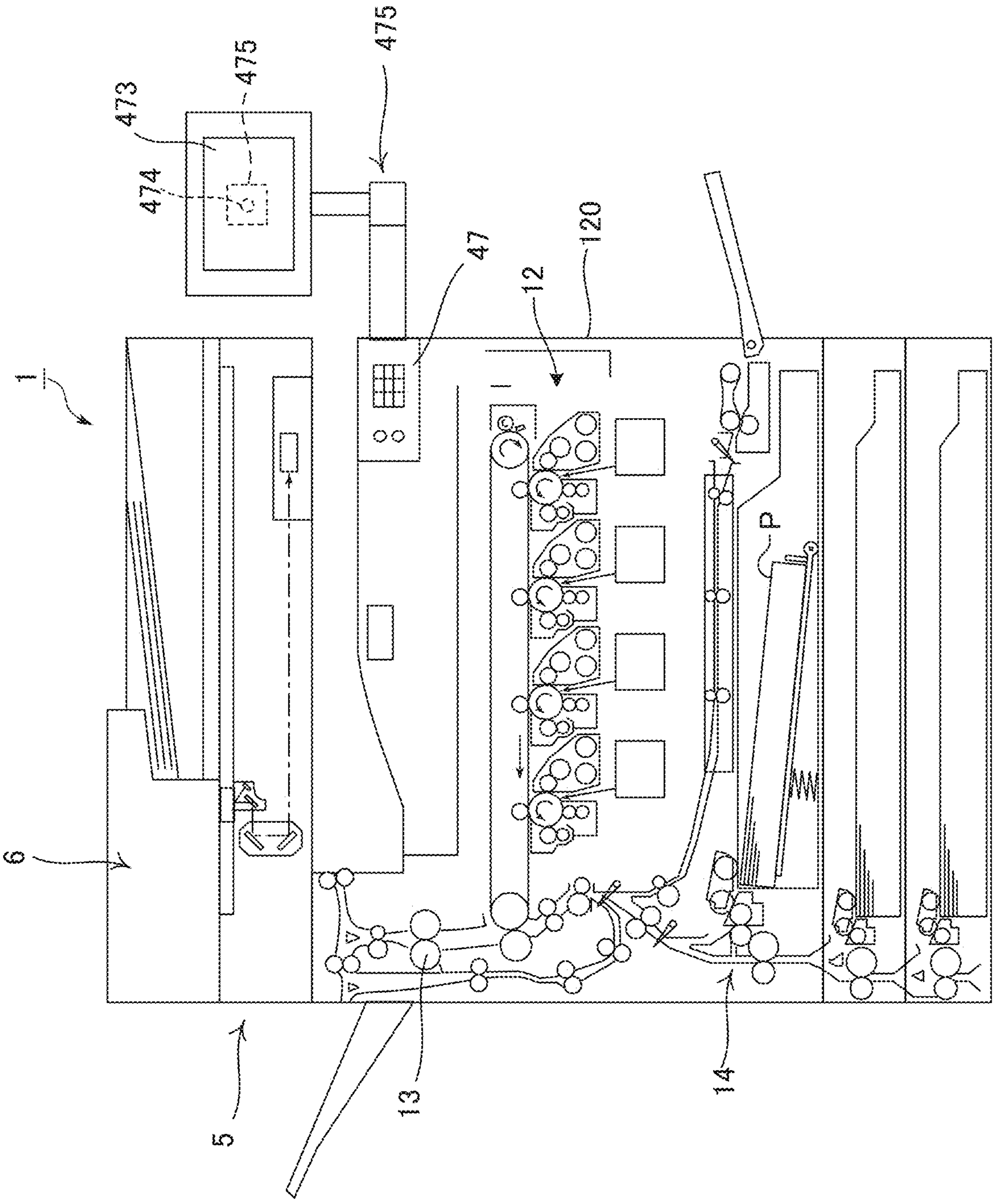
FIG. 1 is a front cross-sectional view showing a structure of an image forming apparatus according to a first embodiment of the disclosure.
Figure 2:
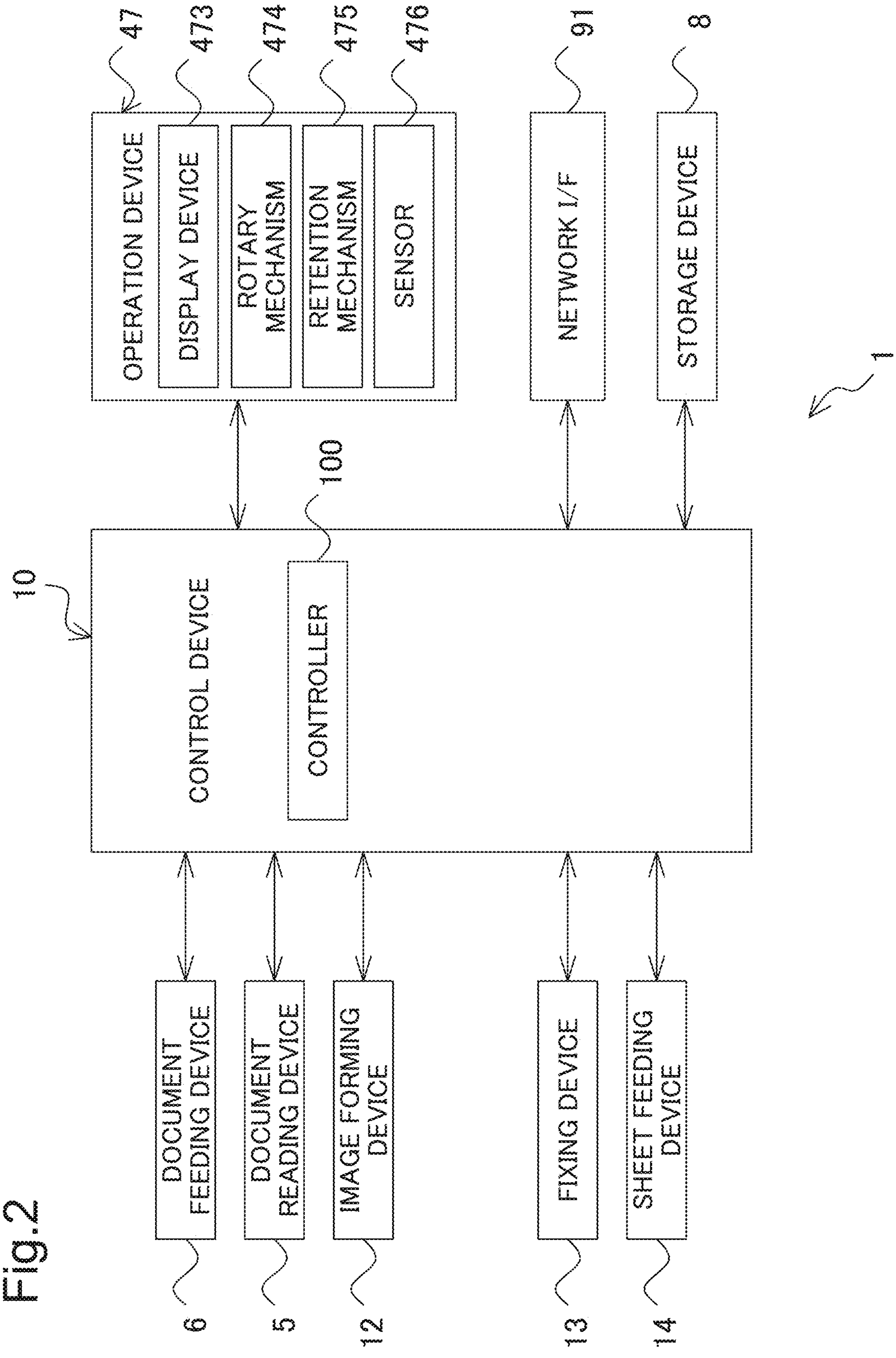
FIG. 2 is a functional block diagram schematically showing an essential internal configuration of the image forming apparatus according to the first embodiment of the disclosure.

Hereafter, an information processing apparatus according to some embodiments of the disclosure will be described, with reference to the drawings. The information processing apparatus according the embodiments of the disclosure is, for example, an image forming apparatus. FIG. 1 is a front cross-sectional view showing a structure of the image forming apparatus according to a first embodiment of the disclosure. FIG. 2 is a functional block diagram schematically showing an essential internal configuration of the image forming apparatus according to the first embodiment of the disclosure. The left-right direction and up-down direction, which may be referred to in the following description, indicate an exemplary direction in the corresponding drawing, unless otherwise specifically noted.

The image forming apparatus 1 is a multifunction peripheral having a plurality of functions, such as copying, printing, scanning, and facsimile transmission. The image forming apparatus 1 includes a control device 10, a document feeding device 6, a document reading device 5, an image forming device 12, a fixing device 13, a sheet feeding device 14, an operation device 47, a network interface (I/F) 91, and a storage device 8.

The document feeding device 6 is openably connected to the upper face of the document reading device 5, for example via a non-illustrated hinge. The document feeding device 6 serves as a document retention cover, when a document placed on a non-illustrated platen glass is to be read by the document reading device 5. The document feeding device 6 is what is known as an automatic document feeder (ADF), and includes a non-illustrated document tray, to supply the document placed on the document tray to the document reading device 5.

The document reading device 5 includes a scanner, and reads the document delivered from the document feeding device 6, or placed on the platen glass.

To perform the document reading operation, the image forming apparatus 1 operates as follows. The document reading device 5 optically reads the image on the document delivered from the document feeding device 6 to the document reading device 5, or placed on the platen glass, and generates image data. The image data generated by the document reading device 5 is stored, for example, in a non-illustrated image memory.

To perform the image forming operation, the image forming apparatus 1 operates as follows. The image forming device 12 is a mechanism including a photoconductor drum, a charging device, an exposure device, a developing device, and a primary transfer device for each of the colors, and configured to form an image on a recording sheet, exemplifying the recording medium in the disclosure, by secondary transfer via an intermediate transfer belt. The image forming device 12 forms a toner image on the recording sheet delivered from the sheet feeding device 14, thereby producing a printed material, on the basis of the image data generated through the document reading operation, image data stored in the image memory, or image data received from a computer connected via the network. The sheet feeding device 14 includes one or more sheet cassettes, and also a pickup roller, a transport roller, a transport route, and a drive mechanism for each of the rollers, for drawing out the recording sheet from the corresponding sheet cassette, and transporting the recording sheet to the image forming device 12.

The fixing device 13 includes a heat roller, a pressure roller, and a drive mechanism therefor, and heats and presses the recording sheet on which the toner image has been formed by the image forming device 12, at the nip region defined between the mentioned rollers, to thereby fix the toner image onto the recording sheet. The recording sheet that has undergone the fixing process is delivered to a non-illustrated output tray.

The operation device 47 includes various hard keys to be operated by the user, receives the user's instructions inputted with the hard keys, to execute the functions and operations that the image forming apparatus 1 is configured to perform, for example the image forming operation.

The operation device 47 includes a display device 473 for displaying, for example, an operation guide for the user, a rotary mechanism 474, a retention mechanism 475, and a sensor 476. The operation device 47 receives, through a touch panel provided on the display device 473, the user's instruction based on the touch operation performed by the user on the screen displayed on the display device 473, or on a physical key.

The display device 473, having a rectangular shape including long sides and short sides, is constituted of, for example, a liquid crystal display (LCD). The display device 473 includes the touch panel. When the user touches a button or a key displayed on the screen, the touch panel receives the instruction corresponding to the touched position. In this case, the touch panel acts as a part of the operation device.

The retention mechanism 475 is an arm-shaped member for attaching the display device 473 to a main body 120 of the image forming apparatus 1. The retention mechanism 475 rotatably supports the display device 473, and temporarily fixes the display device 473 in either the landscape orientation or the portrait orientation. The retention mechanism 475 includes an engaging portion of a recessed shape, opposed to the display device 473 and located at each of positions corresponding to the landscape orientation and the portrait orientation of the display device 473. The display device 473 includes protrusions that fit in the respective engaging portions, located on the side face opposed to the retention mechanism 475. When the display device 473 assumes the landscape orientation (FIGS. 3A and 3G) or the portrait orientation (FIG. 3D), the recess and the protrusion fit with each other, so that the posture of the display device 473 is fixed and retained.

The rotary mechanism 474 is interposed between the retention mechanism 475 and the display device 473. In other words, the retention mechanism 475 rotatably supports the display device 473, via the rotary mechanism 474. The rotary mechanism 474 includes a rotary shaft, which is rotatably supported by the retention mechanism 475. The rotary shaft is attached to a rectangular-shaped central portion of the side face of the display device 473 opposed to the retention mechanism 475, so as to rotate interlocked with the display device 473. The rotary shaft includes, as will be subsequently described, a cam attached to the circumferential surface so as to rotate interlocked with the rotary shaft.

Figures 3A, 3B, 3C, 3D, 3E, 3F, 3G:
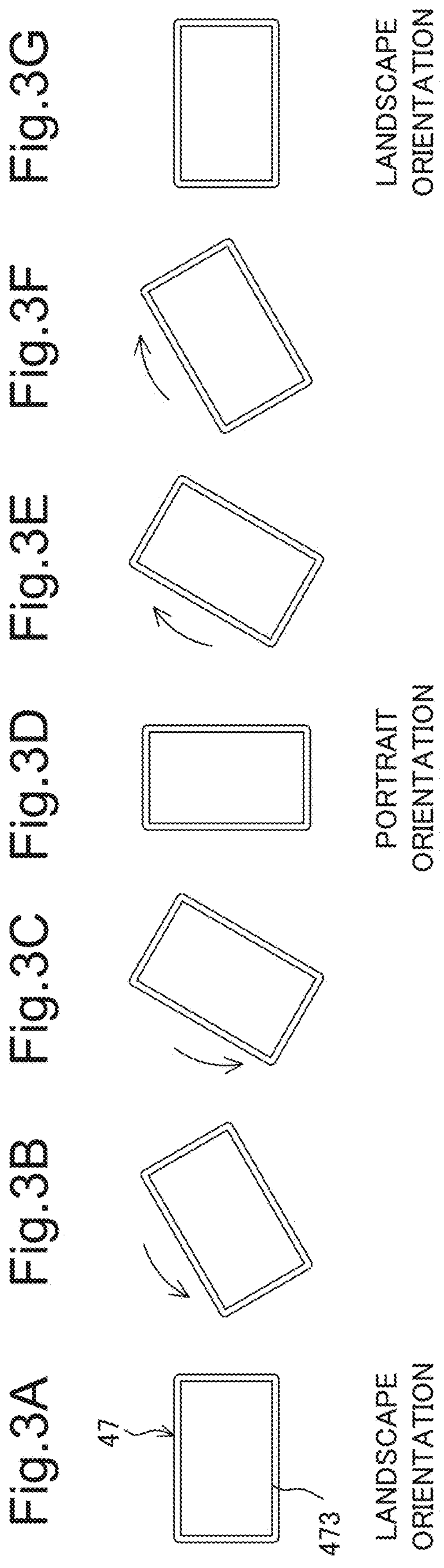
FIG. 3A to FIG. 3G are schematic drawings for explaining an example of rotation of a display device.

FIGS. 3A to 3G are schematic drawings for explaining an example of the rotation of the display device 473. The display device 473 assuming the landscape orientation as shown in FIG. 3A rotates counterclockwise as shown in FIGS. 3B to 3D, thereby assuming the portrait orientation. The display device 473 shifted to the portrait orientation as shown in FIG. 3D rotates clockwise as shown in FIGS. 3E to 3G, thereby assuming the landscape orientation.

Thus, the rotary mechanism 474 is configured to rotate the display device 473 counterclockwise as shown in FIGS. 3B to 3D, in a view from the side of the surface of the display device 473, thereby shifting the display device 473 from the landscape orientation to the portrait orientation. Here, although the display device 473 is configured to rotate in the range of 90 degrees in this embodiment, the range of rotation angle is not limited to 90 degrees. In addition, the rotation direction of the display device 473, and the process of shifting the display device 473 from the landscape orientation to the portrait orientation, according to this embodiment, are merely exemplary.

The sensor 476 includes a switching mechanism that detects the landscape orientation and the portrait orientation of the display device 473. The switching mechanism is located so as to be subjected to the pressure of the cam lobe (protrusion) of the cam attached to the rotary shaft, when the display device 473 assumes the portrait orientation. The switching mechanism outputs an On-signal (Low-signal) to the control device 10, upon being pressed by the cam lobe. In other words, the switching mechanism is located so as to be exempted from the pressure of the cam lobe, unless the display device 473 is shifted to the portrait orientation.

As a specific example of the method by which the rotary mechanism 474 shifts the display device 473 from the landscape orientation to the portrait orientation, by rotating the display device 473 counterclockwise as shown in FIGS. 3B to 3D, in a view from the side of the surface of the display device 473, the cam lobe may be enabled to make access to the switching mechanism, only when the display device 473 is rotating counterclockwise, but disabled from proceeding to the switching mechanism, when the display device 473 is rotating clockwise (e.g., a protrusion that restricts the cam lobe from proceeding toward the switching mechanism, from the clockwise direction, may be provided on the outer edge of the switching mechanism).

Figure 4A:
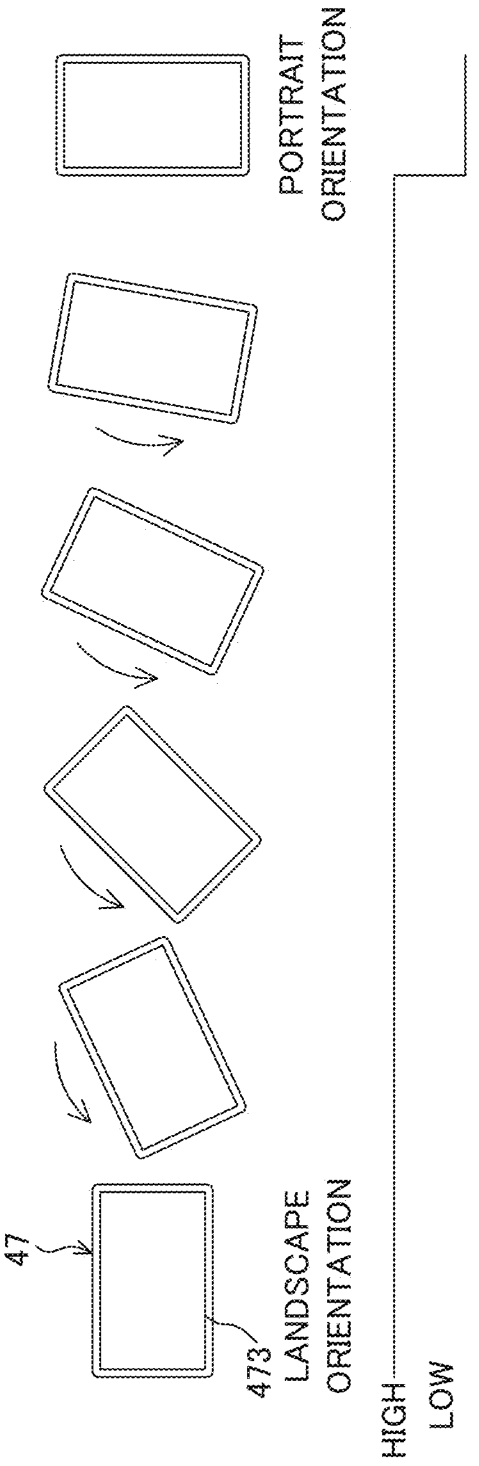
FIG. 4A and FIG. 4B are schematic drawings for explaining variation of signals outputted from a sensor.
Figure 4B:
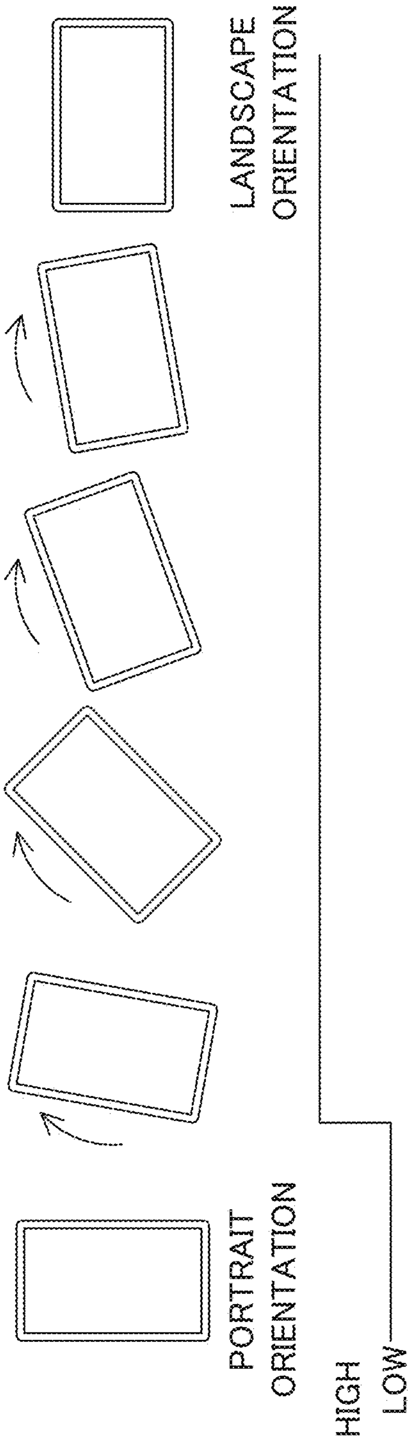

FIGS. 4A and 4B are schematic drawings for explaining the variation of the signals outputted from the sensor 476, located at the position corresponding to the portrait orientation of the display device 473. As shown in FIGS. 4A and 4B, the sensor 476 located at the position corresponding to the portrait orientation of the display device 473 outputs the Low-signal to the control device 10, when the display device 473 is assuming the portrait orientation (when the switching mechanism is subjected to the pressure from the cam lobe), and outputs the High-signal to the control device 10, when the display device 473 is not in the portrait orientation (when the switching mechanism is exempted from the pressure of the cam lobe).

Accordingly, the sensor 476 either outputs the Low-signal to the control device 10, when the display device 473 is assuming the portrait orientation as shown in FIG. 3D, or outputs the High-signal to the control device 10, when the display device 473 is in a posture other than the portrait orientation shown in FIG. 3D. Therefore, 後述する a controller 100 to be subsequently described can decide whether the display device 473 is in the portrait orientation, or another posture than the portrait orientation, on the basis of the signal outputted from the sensor 476. To be more specific, the controller 100 decides that the display device 473 is in the portrait orientation, when the display device 473 is assuming the portrait orientation shown in FIG. 3D, and that the display device 473 is in the landscape orientation, in all the cases where the display device 473 is not in the portrait orientation.

The network I/F 91 is a communication interface that transmits and receives various types of data to and from an external device (e.g., personal computer) inside a local area, or on the internet.

The storage device 8 is a large-capacity storage device such as a hard disk drive (HDD) and a solid-state drive (SSD), and contains various control programs.

The control device 10 includes a processor, a random-access memory (RAM), a read-only memory (ROM), and an exclusive hardware circuit. The processor is, for example, a central processing unit (CPU), an application specific integrated circuit (ASIC), or a micro processing unit (MPU). The control device 10 includes a controller 100.

The control device 10 acts as the controller 100, when the processor operates according to the control program stored in the storage device 8. Here, the controller 100 may be constituted in the form of a hardware circuit, instead of being realized by the operation of the control device 10 according to the control program. This also applies to other embodiments, unless otherwise specifically noted.

The controller 100 serves to control the overall operation of the image forming apparatus 1. The controller 100 is connected to the document feeding device 6, the document reading device 5, the image forming device 12, the fixing device 13, the sheet feeding device 14, the operation device 47, the network I/F 91, and the storage device 8, and controls the operation of the mentioned components. For example, the controller 100 executes some processings required for the image forming operation to be performed by the image forming apparatus 1.

Figure 5:
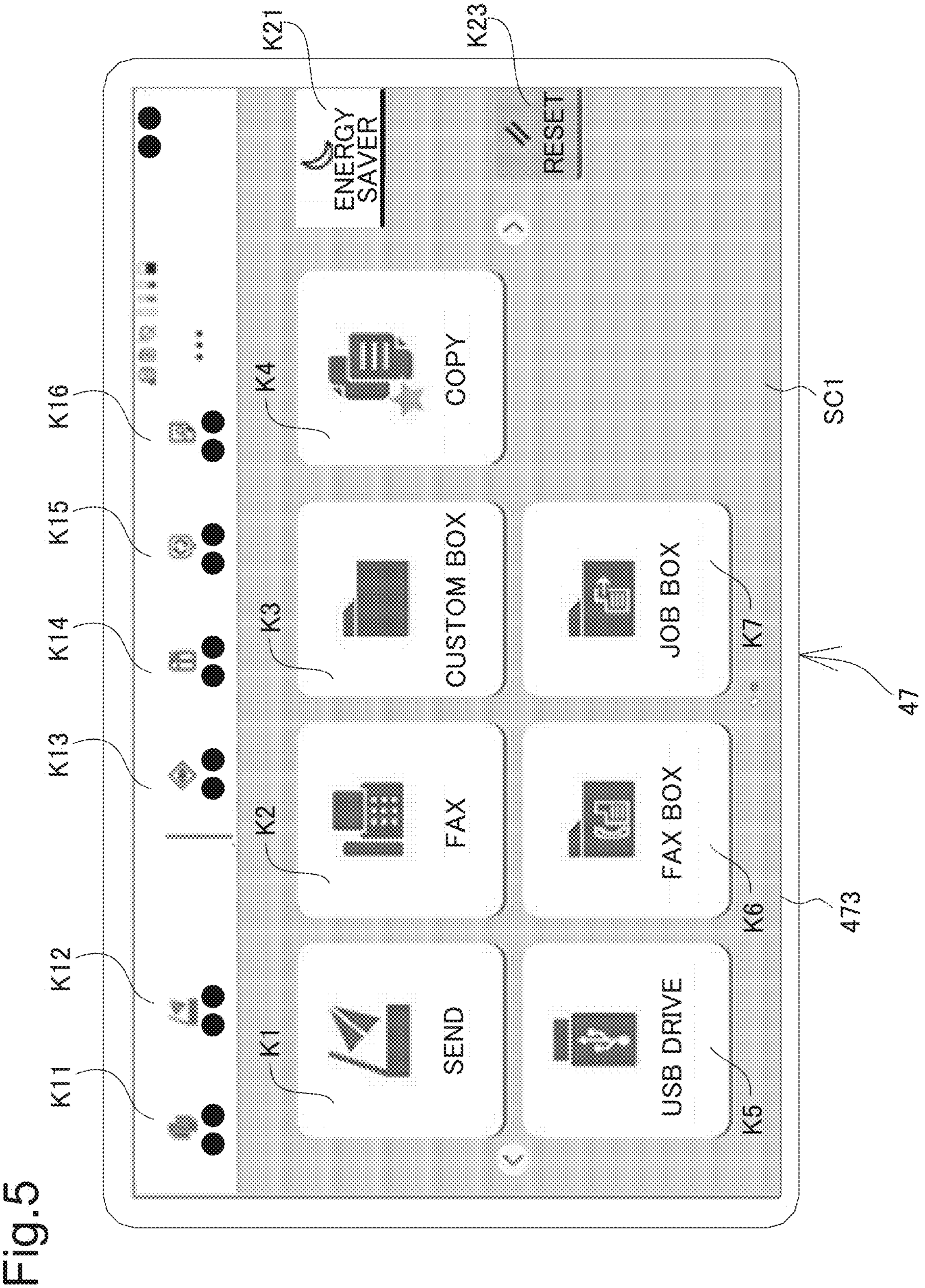
FIG. 5, FIG. 6A, FIG. 6B, FIG. 6C, FIG. 7, FIG. 8, and FIG. 9 are schematic drawings each showing an example of a screen displayed on the display device.

The controller 100 also controls the displaying operation of the display device 473. For example, the controller 100 displays an operation screen SC1 on the display device 473, as an example shown in FIG. 5, as "home screen". The operation screen SC1 includes operation keys K1 to K7, for example called as "application icon". For example, the operation key K4 includes a character string "Copy" accompanied with a drawing illustrating the copying operation. The operation screen SC1 also includes operation keys K11 to K16, for example called as "task icon", aligned along the upper end portion, and operation keys K21 and K23 located on the right-hand end portion.

The controller 100 executes the control according to the instruction received by the operation device 47. For example, when the operation device 47 receives, through the touch panel, the instruction inputted through the operation key K4, the controller 100 controls the display device 473 according to such instruction, so as to shift the screen on the display device 473 from the "home screen" to an operation screen SC2, displaying a "copy screen", as an example shown in FIG. 6A.

Figure 6A:
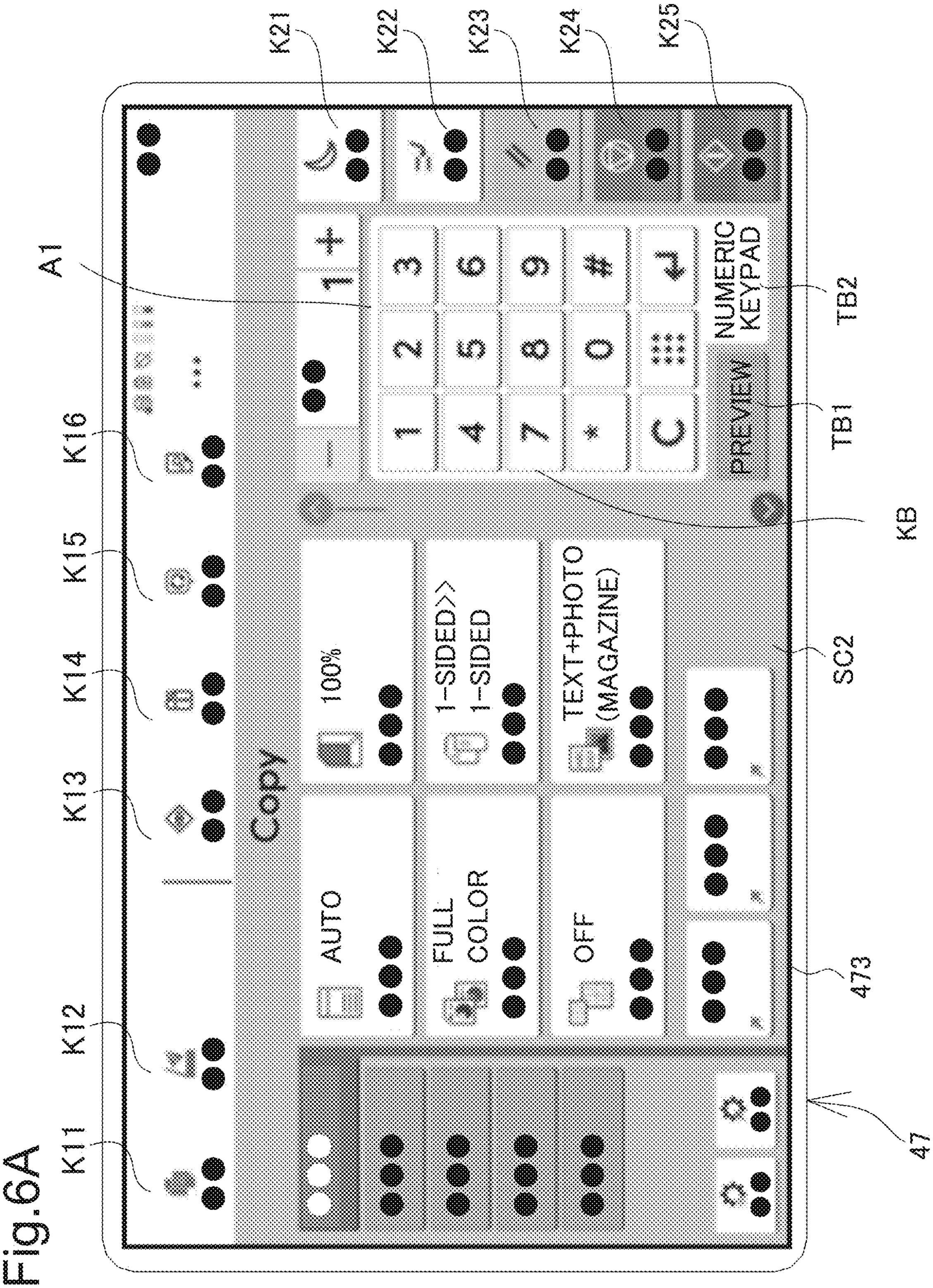

The operation screen SC2 shown in FIG. 6A includes, like the operation screen SC1, the operation keys K11 to K16 aligned along the upper end portion. The operation screen SC2 also includes operation keys K22, K24, and K25 located on the right-hand end portion, in addition to the operation keys K21 and K23. The operation key K25 is an icon including a character string "START".

The operation screen SC2 shown in FIG. 6A includes a numeric keypad display region A1, for displaying a numeric keypad KB. The operation screen SC2 further includes tabs TB1 and TB2. The tab TB1 is for inputting the instruction to display the preview image. The tab TB2 is for inputting the instruction to display the numeric keypad.

Figure 6B:
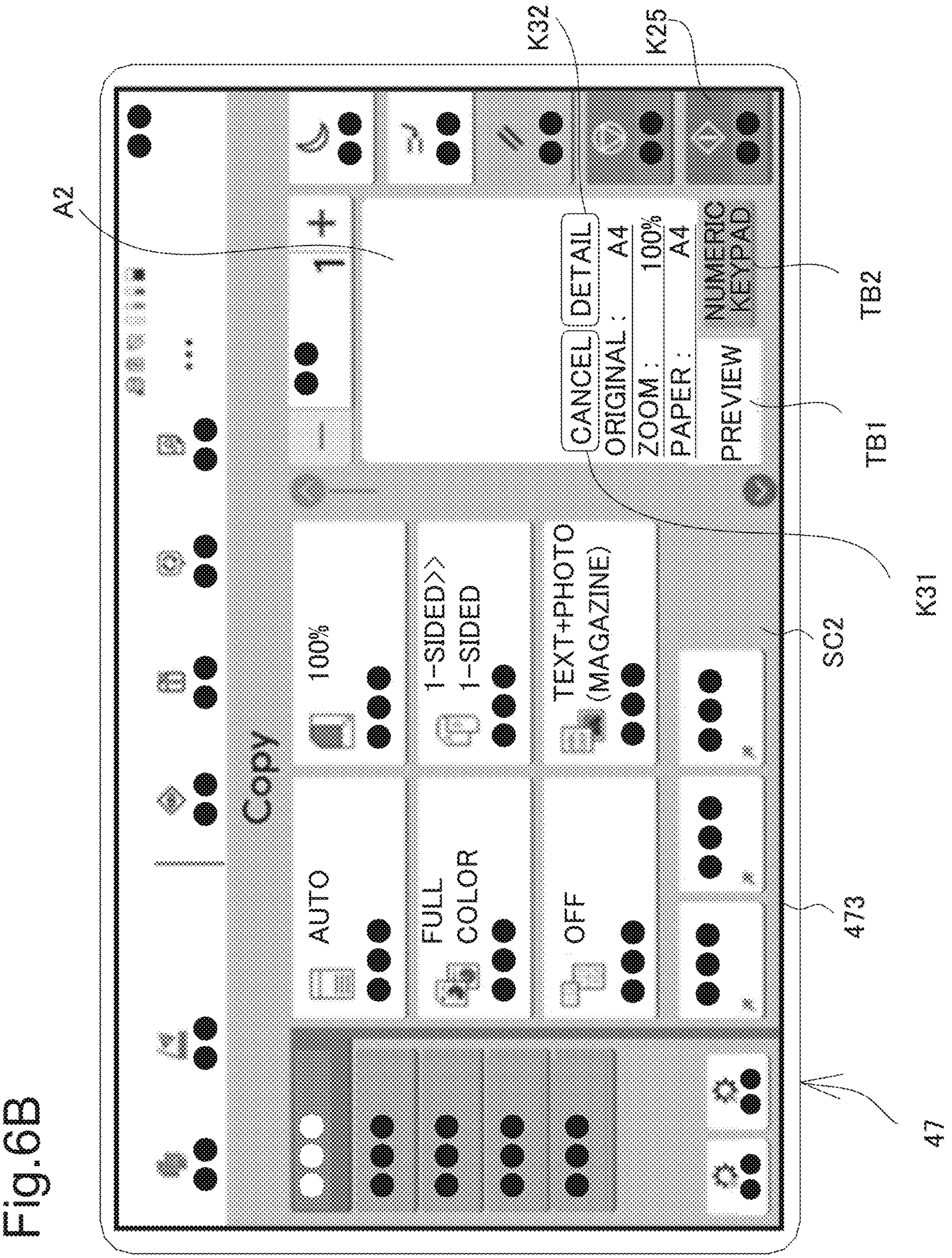

When the operation device 47 receives, through the touch panel, the instruction inputted through the tab TB1, while the operation screen SC2 shown in FIG. 6A is displayed, the controller 100 displays a preview image display region A2 in the operation screen SC2 as shown in FIG. 6B, according to the instruction. The preview image display region A2 is for displaying a preview image PV1 of a printed material, to be obtained through the image forming operation by the image forming device 12.

The mentioned display regions are switched by the controller 100, according to the instruction inputted through the tab TB1 or TB2. When the operation device 47 receives, through the touch panel, the instruction inputted through the tab TB2 marked as "Numeric Keypad", the controller 100 displays the numeric keypad display region A1 in the operation screen SC2, and the numeric keypad KB in the numeric keypad display region A1, as shown in FIG. 6A.

Figure 6C:
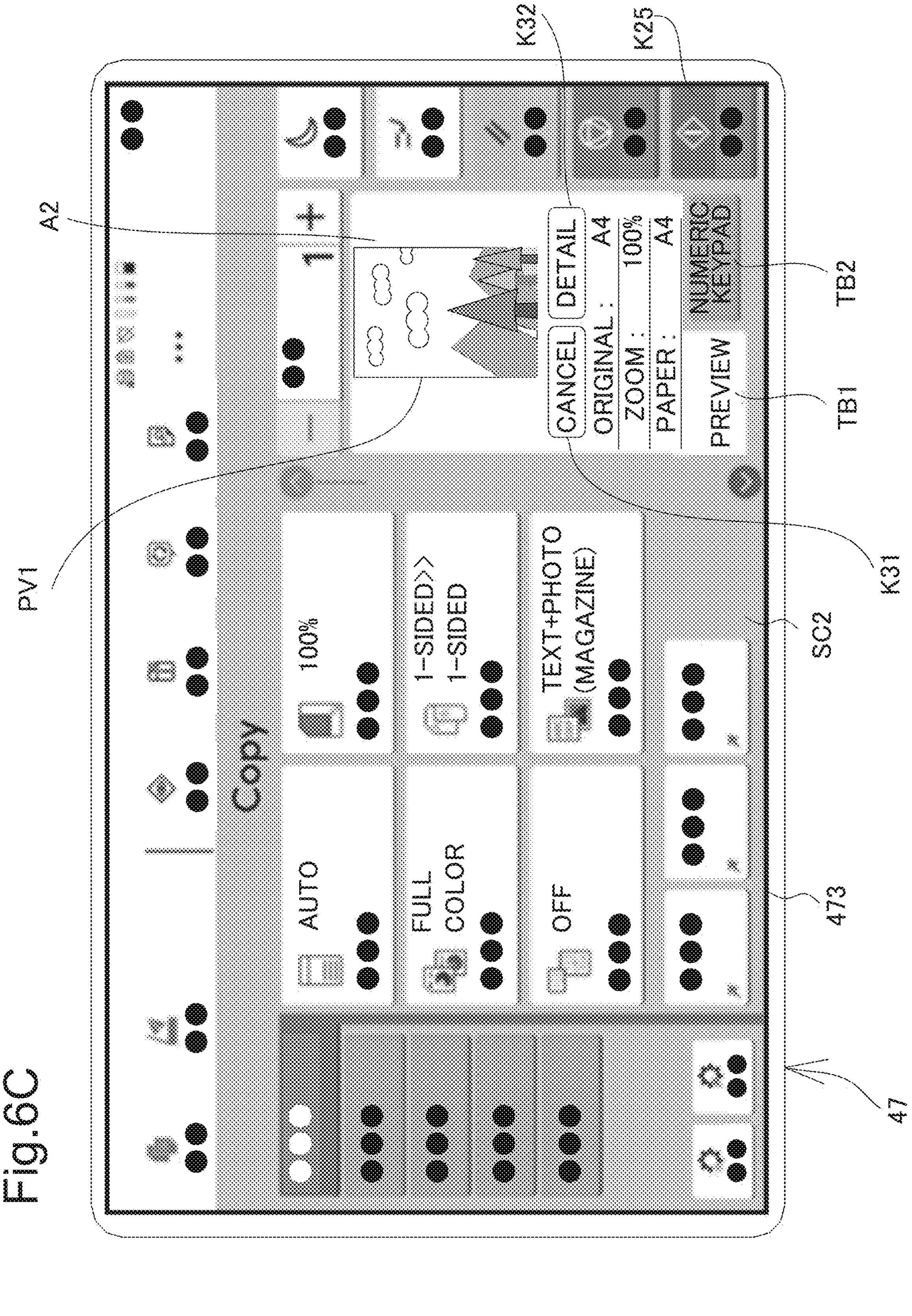

When the operation device 47 receives the instruction inputted through the operation key K25 marked as "START" in the operation screen SC2, while the preview image display region A2 is displayed in the operation screen SC2 as shown in FIG. 6B, the controller 100 starts the copying operation, by causing the document reading device 5 to read the document delivered from the document feeding device 6 or placed on the platen glass. Then the controller 100 displays the preview image PV1, representing the image acquired through the document reading operation, in the preview image display region A2, such that the upper and lower edges of the preview image PV1 become parallel to the long sides of the display device 473, as shown in FIG. 6C. Then the controller 100 once suspends the copying operation, after the document reading operation, and before the image forming operation on the recording sheet.

Here, the method to display the preview image, and the timing to read the document may be modified as desired, without limitation to the above. For example, when the operation device 47 receives the copying instruction, the controller 100 may once suspend the copying operation after causing the document reading device 5 to read the document, thus putting the image forming operation on hold, and display, at this point, the operation screen SC2 shown in FIG. 6A. Then the controller 100 may display, when the operation device 47 receives the instruction inputted through the tab TB1, the preview image display region A2 and the preview image PV1 in the operation screen SC2.

The operation screen SC2 shown in FIG. 6C includes an operation key K31 marked as "Cancel", for inputting a suspension instruction to suspend the image forming operation based on the image data corresponding to the preview image PV1, and an operation key K32 marked as "Detail", for inputting an instruction to display the details of the preview image PV1.

When the operation device 47 receives the instruction inputted through the operation key K31, the controller 100 suspends the copying operation that has already been started, and restricts the execution of the image forming operation subsequently scheduled. At this point, the controller 100 deletes the image data acquired through the document reading operation from the image memory, and erases the preview image PV1 in the operation screen SC2.

Figure 7:
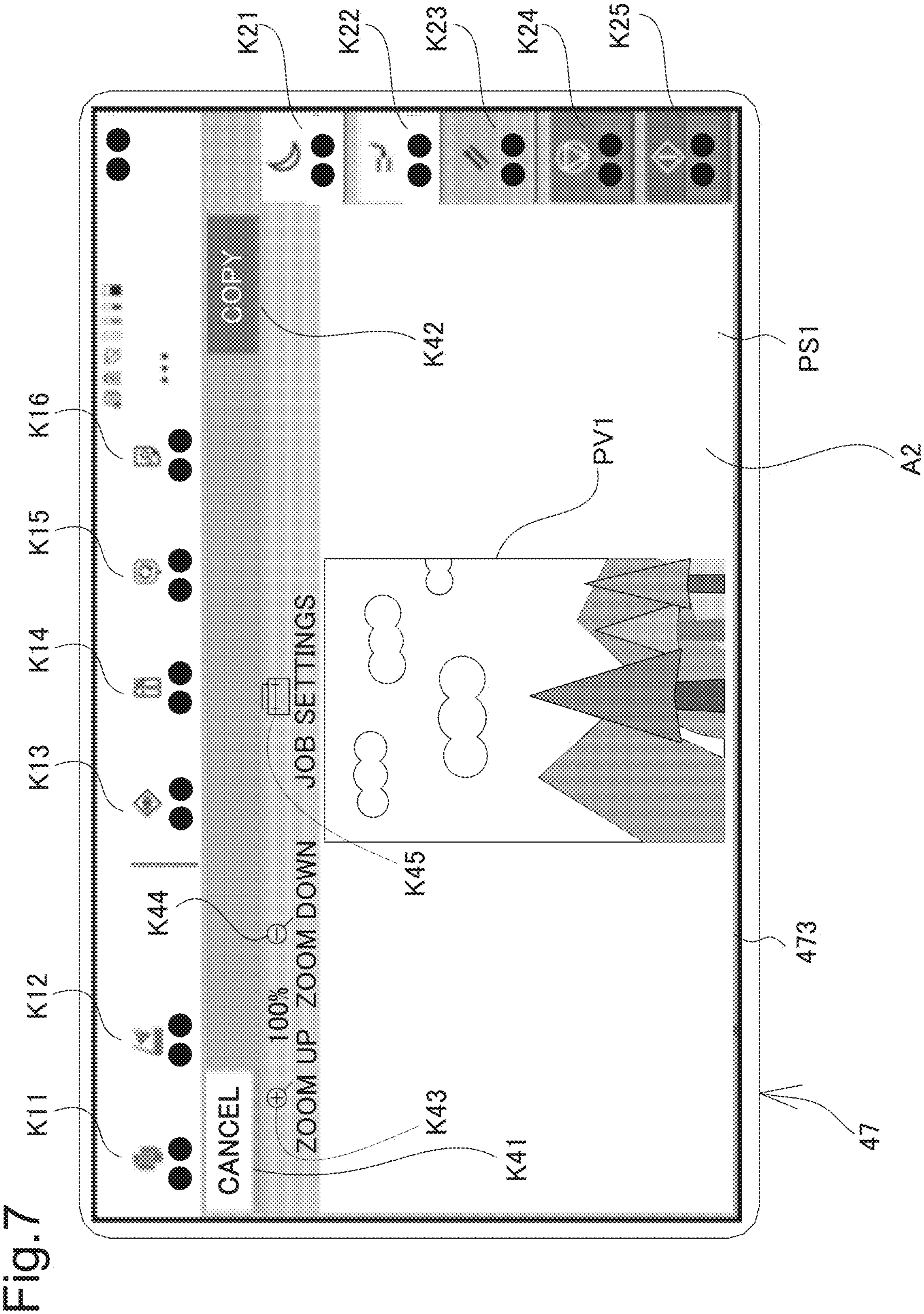

When the operation device 47 receives the instruction inputted through the operation key K32, the controller 100 enlarges the size of the preview image display region A2 to a first enlarged size ES1, and also enlarges the display size of the preview image PV1 so as to fit the first enlarged size ES1, as shown in FIG. 7. Therefore, the instruction inputted through the operation key K32 marked as "Detail" may also be construed as the instruction to enlarge the preview image PV1.

A first preview screen PS1 shown in FIG. 7 includes, like the operation screen SC2, the operation keys K11 to K16 aligned along the upper end portion, and the operation keys K21 to K25 aligned along the right-hand end portion. The first preview screen PS1 also includes an operation key K41 marked as "Cancel", for inputting a suspension instruction to suspend the image forming operation (job) based on the image data corresponding to the preview image PV1, an operation key K42 marked as "Copy", an operation key K43 representing an illustration of "plus symbol and magnifying glass", for inputting an instruction to enlarge the preview image PV1, an operation key K44 representing an illustration of "minus symbol and magnifying glass", for inputting an instruction to reduce the size of the preview image PV1, and an operation key K45 for inputting an instruction to change the job setting.

Character strings "Zoom up", "Zoom down", and "Job settings" are displayed right under the operation key K43, the operation key K44, and the operation key K45, respectively, and a character string "100%", representing the magnification of the preview image, is displayed between the operation key K43 and the operation key K44.

When the operation device 47 receives the instruction inputted through the operation key K43, or detects a pinch-out operation performed on the preview image display region A2, the controller 100 enlarges the display size of the preview image PV1, and when the operation device 47 receives the instruction inputted through the operation key K44, or detects a pinch-in operation performed on the preview image display region A2, the controller 100 reduces the display size of the preview image PV1.

When the operation device 47 receives the instruction inputted through the operation key K41 marked as "Cancel", while the first preview screen PS1 is displayed, the controller 100 suspends the copying operation that has already been started, and restricts the execution of the image forming operation on the recording sheet subsequently scheduled. On the other hand, when the operation device 47 receives, according to the operation by the user, the image forming instruction associated with the operation key K42 marked as "Copy", or the image forming instruction associated with the operation key K25, the controller 100 causes the image forming device 12 to execute the image forming operation based on the image data acquired through the document reading operation.

Figure 8:
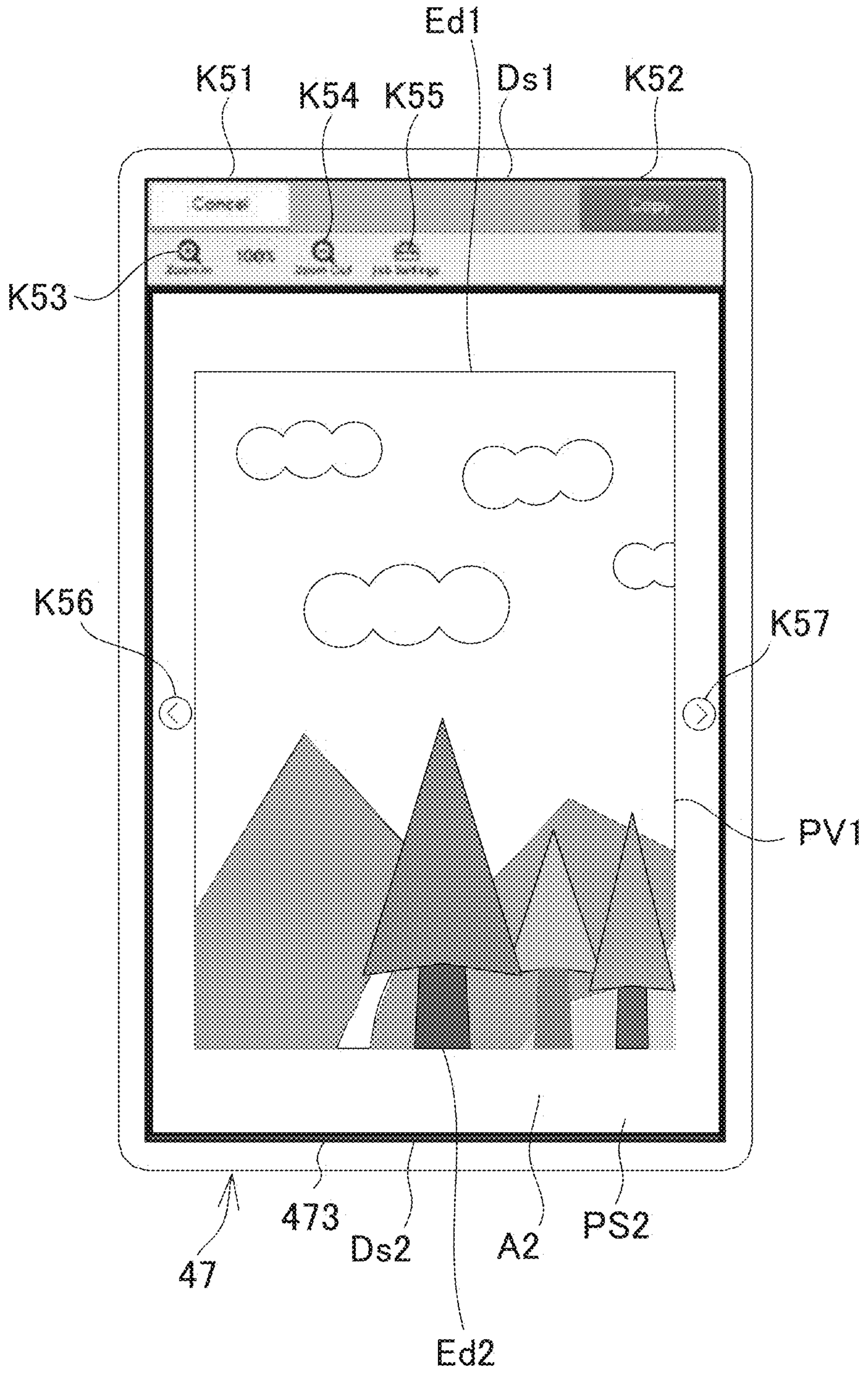

Here, it will be assumed that, when the preview image PV1 is displayed in the preview image display region A2 enlarged to the first enlarged size ES1 (e.g., when the first preview screen PS1 shown in FIG. 7 is displayed on the display device 473), the controller 100 has decided that the display device 473 is in a posture other than the portrait orientation (i.e., landscape orientation), according to the signal outputted from the sensor 476. When the controller 100 detects thereafter that the display device 473 has been shifted from the landscape orientation to the portrait orientation, according to the output from the sensor 476, the controller 100 further enlarges the preview image display region A2, to a second enlarged size ES2, and also enlarges the display size of the preview image PV1 so as to fit the second enlarged size ES2, such that the upper and lower edges Ed1 and Ed2 of the preview image PV1 become parallel to the short sides Ds1 and Ds2 of the display device 473, as shown in FIG. 8. The second enlarged size ES2 is larger in area than the first enlarged size ES1 by a predetermined ratio, but in the same aspect ratio as the first enlarged size ES1.

When the user manually rotates the display device 473 from the landscape orientation to the portrait orientation, while the first preview screen PS1 is displayed on the display device 473 as above (FIG. 7), the screen displayed on the display device 473 by the controller 100 is shifted from the first preview screen PS1 to the second preview screen PS2 (FIG. 8), so that the preview image PV1 is displayed in the enlarged size.

Figure 9:
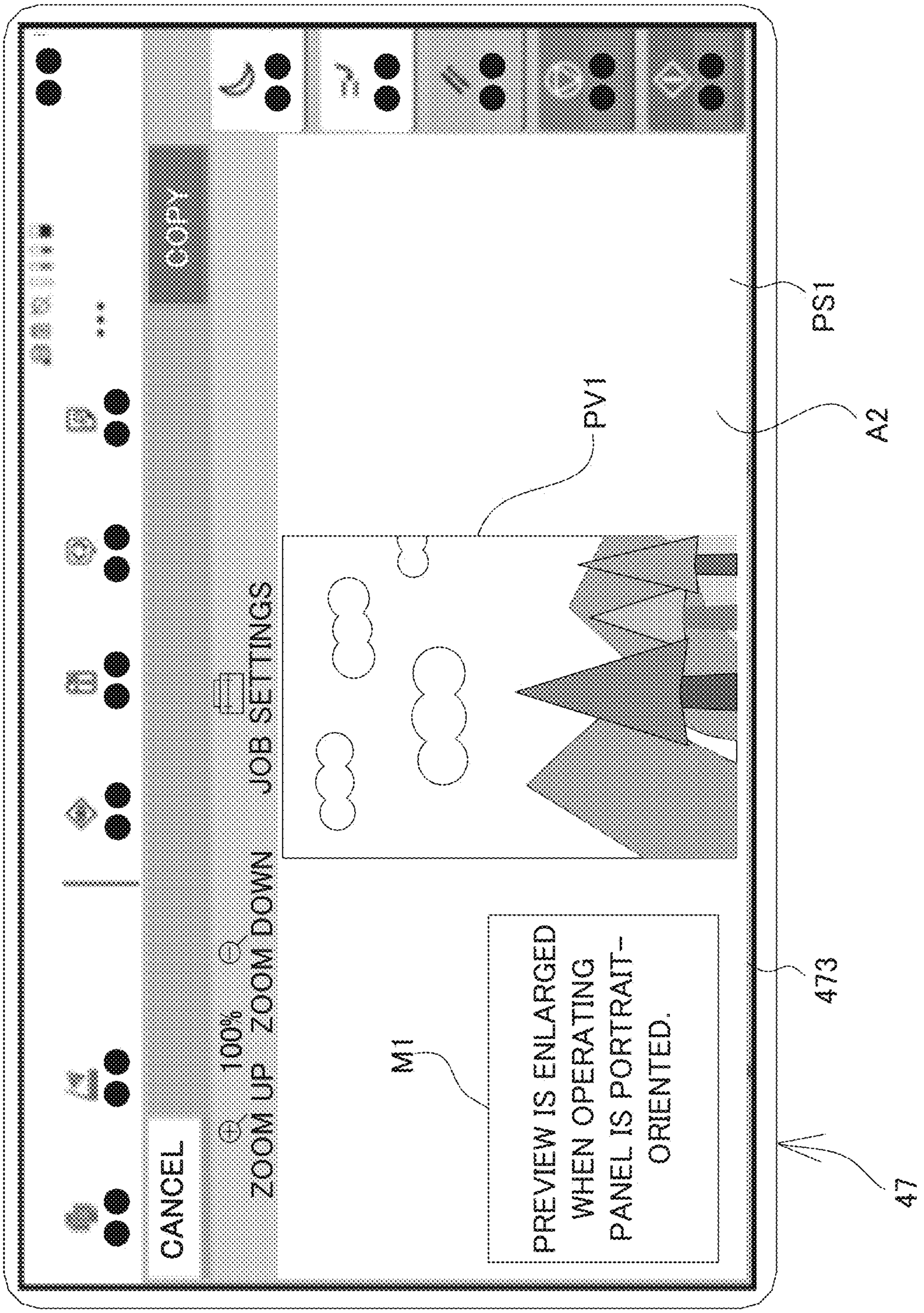

Here, such transition of the screen may be notified in advance to the user, at the time that the first preview screen PS1 is displayed. For example, the controller 100 may display a message M1 to such an effect that "Preview is Enlarged When Operating Panel is Portrait-Oriented." in the first preview screen PS1, as shown in FIG. 9.

The second preview screen PS2 shown in FIG. 8 includes, in the upper end portion, an operation key K51 representing the illustration of "plus symbol and magnifying glass", for inputting the instruction to enlarge the display size of the preview image PV1, and an operation key K52 representing the illustration of "minus symbol and magnifying glass", for inputting the instruction to reduce the display size of the preview image PV1. The second preview screen PS2 also includes an operation key K53, representing a left-pointing arrow and located on the left-hand end portion, for inputting an instruction to turn the screen to the previous page, and an operation key K54, representing a right-pointing arrow and located on the right-hand end portion, for inputting an instruction to turn the screen to the next page. The operation keys K51 to K54 are all graphical icons. The operation keys K51 to K54 are related to the display form of the preview image PV1.

When the operation device 47 receives the instruction inputted through the operation key K51 marked as "Cancel", in other words the suspension instruction for suspending the job scheduled at this point with respect to the image data corresponding to the preview image PV1, the controller 100 suspends the execution of the job, according to the instruction. For example, when the document image acquired through the document reading operation by the document reading device 5 is displayed on the display device 473 as the preview image, the controller 100 suspends, according to the suspension instruction received, the image forming operation of the document images, acquired subsequent to the mentioned document reading operation. Thereafter, the controller 100 displays the operation screen SC1 on the display device 473.

When the operation device 47 receives the instruction inputted through the operation key K52 marked as "Copy", in other words the resumption instruction to resume the job scheduled at this point with respect to the image data corresponding to the preview image PV1, the controller 100 resumes the job, according to the resumption instruction. For example, when the document image acquired through the document reading operation by the document reading device 5 is displayed on the display device 473 as the preview image, according to the copying instruction, the controller 100 causes the image forming device 12, according to the resumption instruction received, to execute the image forming operation of the document images, acquired subsequent to the mentioned document reading operation. Thereafter, the controller 100 displays the operation screen SC1 on the display device 473.

Further, when the sensor 476 detects that the display device 473 has been shifted from the portrait orientation to the landscape orientation, in the state where the second preview screen PS2 is displayed on the display device 473, and the job with respect to the image data corresponding to the preview image PV1 is temporarily suspended, the controller 100 displays a message urging the user to input an instruction on whether to resume the job, on the display device 43.

Figure 10:
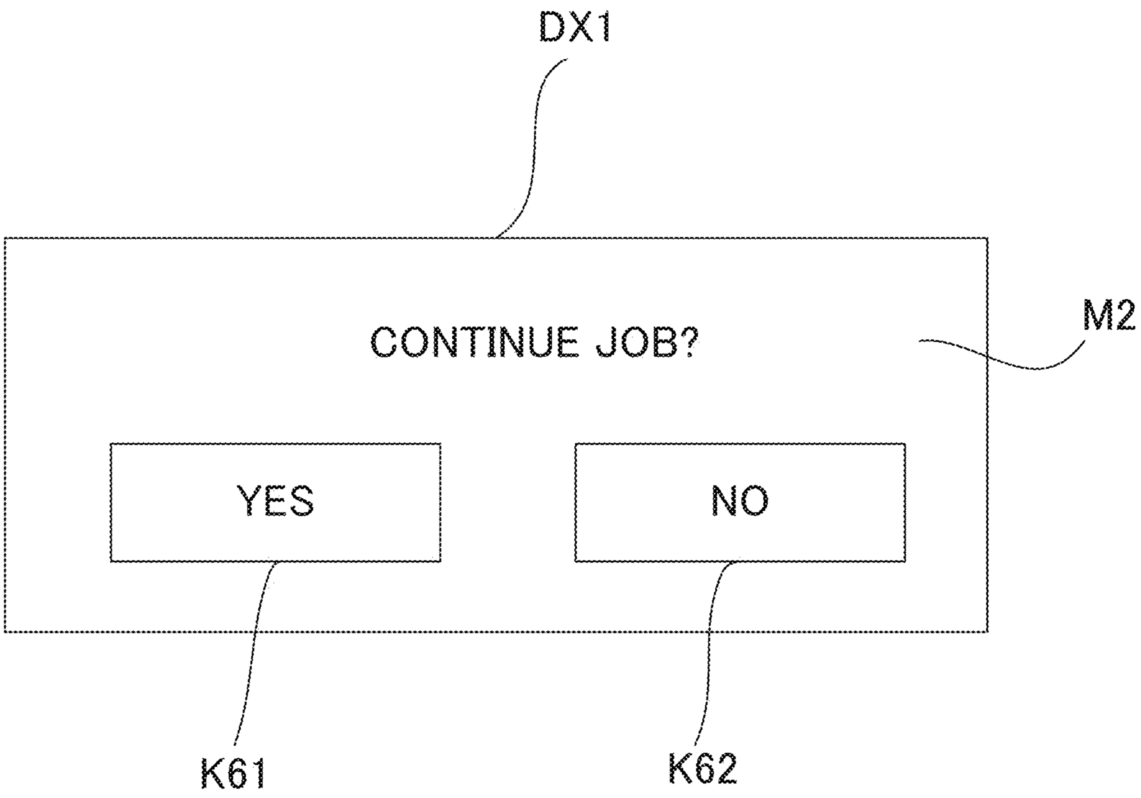
FIG. 10 is a schematic drawing showing an example of a dialog box displayed on the display device.

The controller 100 displays a dialog box DX1 on the display device 473, as an example shown in FIG. 10. The dialog box DX1 includes a message M2 asking whether the job is to be executed, an operation key K61 marked as "Yes", and an operation key K62 marked as "No". The message M2 is for asking the user whether the copying job may be resumed (continued), for example when the document image acquired through the document reading operation by the document reading device 5 is displayed on the display device 473 as the preview image, according to the copying instruction.

When the operation device 47 receives the instruction inputted through the operation key K61 marked as "Yes" in the dialog box DX1, in other words the resumption instruction to resume the job, the controller 100 resumes the job. In the case of the mentioned example, the controller 100 causes the image forming device 12 to execute the image forming operation of the document images, acquired subsequent to the mentioned document reading operation.

In contrast, when the operation device 47 receives the instruction inputted through the operation key K62 marked as "No" in the dialog box DX1, in other words the suspension instruction to suspend the job, the controller 100 suspends the job. In the case of the mentioned example, the controller 100 suspends the image forming operation of the document images, acquired subsequent to the mentioned document reading operation. Here, the controller 100 may save the document image acquired through the document reading operation, and stand by for an input of the setting for the image forming operation of the document image. Then, when the operation device 47 receives the instruction indicating the setting for the image forming operation of the document image, the controller may cause the image forming device 12 to execute the image forming operation of the document image.

Figure 11:
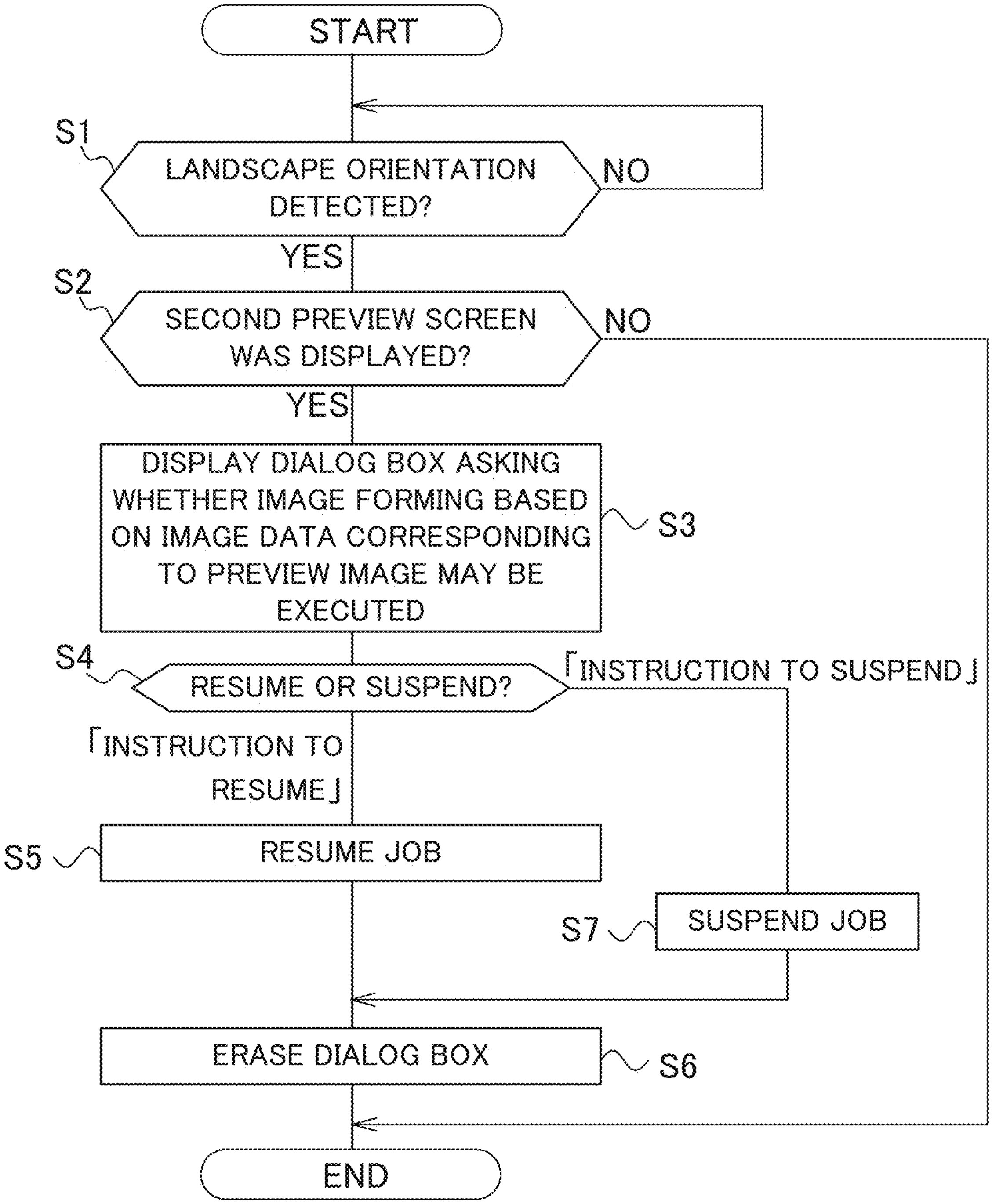
FIG. 11 is a flowchart showing a display control process according to the first embodiment, performed by a controller in relation with variation in posture of the display device.

Hereunder, a display control process according to the first embodiment, performed by the controller 100 in relation with the transition in posture of the display device 473, will be described. FIG. 11 is a flowchart showing the display control process according to the first embodiment, performed by the controller 100 in relation with the transition in posture of the display device 473.

The controller 100 decides whether the sensor 476 has detected a transition in posture of the display device 473, from the portrait orientation to the landscape orientation (i.e., whether the signal outputted from the sensor 476 to the control device 10 has been switched from the Low-signal to the High-signal (S1).

Upon deciding that the sensor 476 has detected the transition in posture of the display device 473, from the portrait orientation to the landscape orientation (YES at S1), the controller 100 decides whether the second preview screen PS2 was displayed on the display device 473, when the display device 473 was in the portrait orientation (S2). Here, in the case where the controller 100 executes the operation according to the suspension instruction associated with the operation key K51, or according to the resumption instruction associated with the operation key K52, when the second preview screen PS2 is displayed on the display device 473, the operation screen SC1 is displayed on the display device 473 as described above, and the display of the second preview screen PS2 is erased. Therefore, in the case where the second preview screen PS2 was displayed on the display device 473, up to the time point that the sensor 476 has detected the transition of the display device 473 from the portrait orientation to the landscape orientation, it can be construed that neither of the suspension instruction and the resumption instruction have been executed.

Upon deciding that the second preview screen PS2 was displayed on the display device 473 (YES at S2), the controller 100 displays the dialog box DX1 shown in FIG. 10, on the display device 473 (S3). The dialog box DX1 includes the message M2 asking the user whether the job may be resumed (continued). In the case where the controller 100 decides that the second preview screen PS2 was not displayed on the display device 473 (NO at S2), the process is finished.

After displaying the dialog box DX1, the controller 100 decides whether the operation device 47 has received either of the resumption instruction and the suspension instruction (S4). Upon deciding that the operation device 47 has received the resumption instruction ("Instruction to Resume" at S4), the controller 100 resumes the job (S5). In the case of the mentioned example, the controller 100 causes the image forming device 12 to execute the image forming operation, of the document images acquired subsequent to the document reading operation.

In contrast, upon deciding that the operation device 47 has received the suspension instruction ("Instruction to Suspend" at S4), the controller 100 suspends the job (S7). In the case of the mentioned example, the controller 100 suspends the image forming operation of the document images, acquired subsequent to the document reading operation. The controller 100 then erases the dialog box DX1 from the display device 473 (S6). Thereafter, the process is finished.

Figure 12:
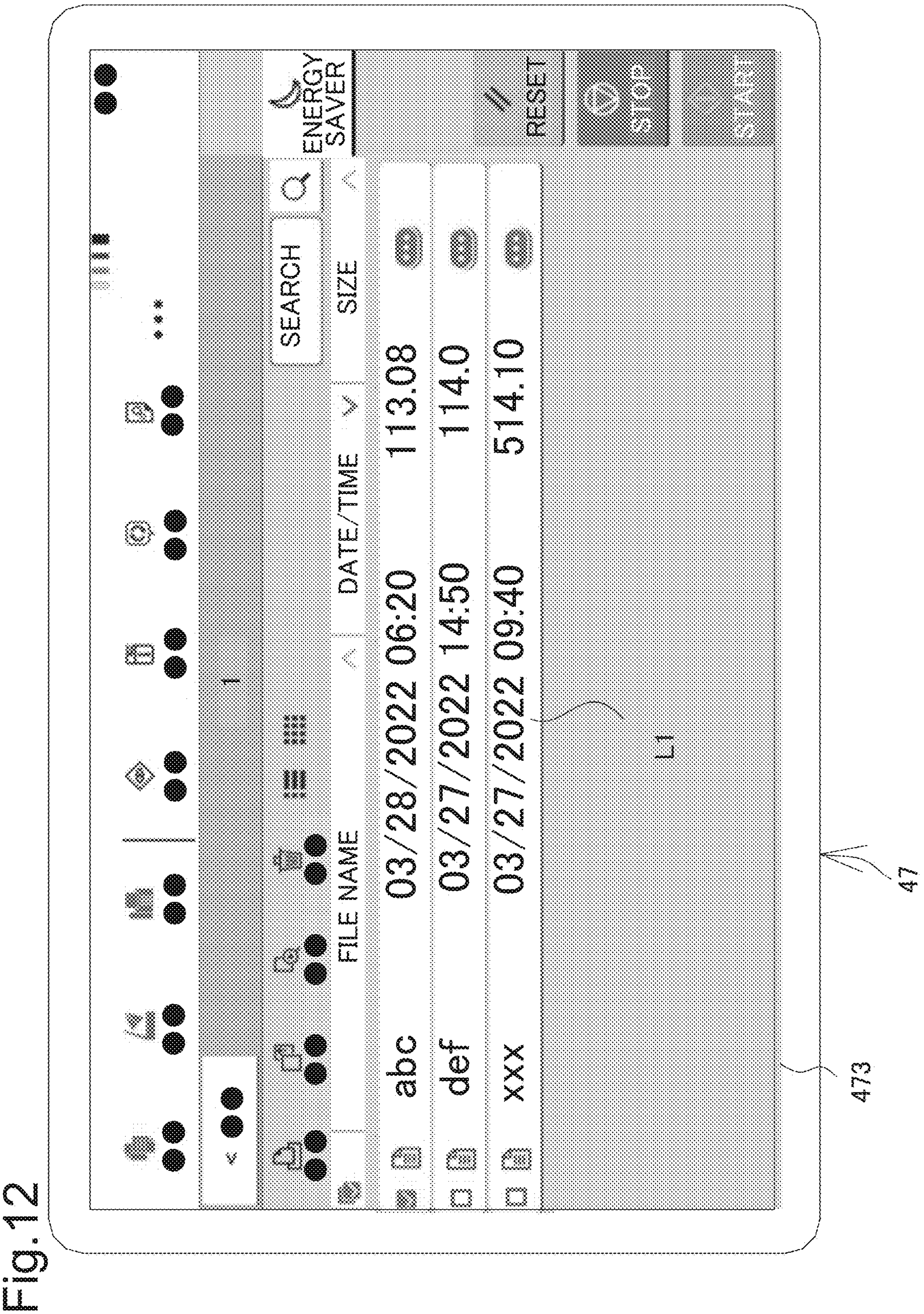
FIG. 12 is a schematic drawing showing an example of a screen displayed on the display device.

This embodiment refers to the case where, when the copying job is to be executed, the document image acquired through the document reading operation by the document reading device 5 is displayed on the display device 473, as the preview image. In addition, a document box may be provided in the storage device 8, as a part of the memory region, so that, when the image data to be displayed on the display device 473 is stored in the document box, the controller 100 may also execute the display control related to the posture transition of the display device 473, to display such image data on the display device 473. Thus, when the image data corresponding to the preview image PV1 is the document data stored in the document box, the controller 100 displays, after suspending the job (S7), a list L1 of the documents represented by the document data stored in the document box, as shown in FIG. 12, on the display device 473.

According to the first embodiment, the message urging the user to input either the resumption instruction or the suspension instruction, with respect to the job based on the image data corresponding to the preview image PV1, is displayed in linkage with the transition in posture of the display device 473, in other words the user's action to shift the display device 473 from the portrait orientation, in which the second preview screen PS2 is displayed, to the landscape orientation. Accordingly, after the user performs such shifting action, a message useful to the user in setting up the job, namely the message urging the user to input either the resumption instruction or the suspension instruction, is presented to the user without standing by for the user's input of the instruction. Such an arrangement improves the convenience in operation for the user.

Figure 13:
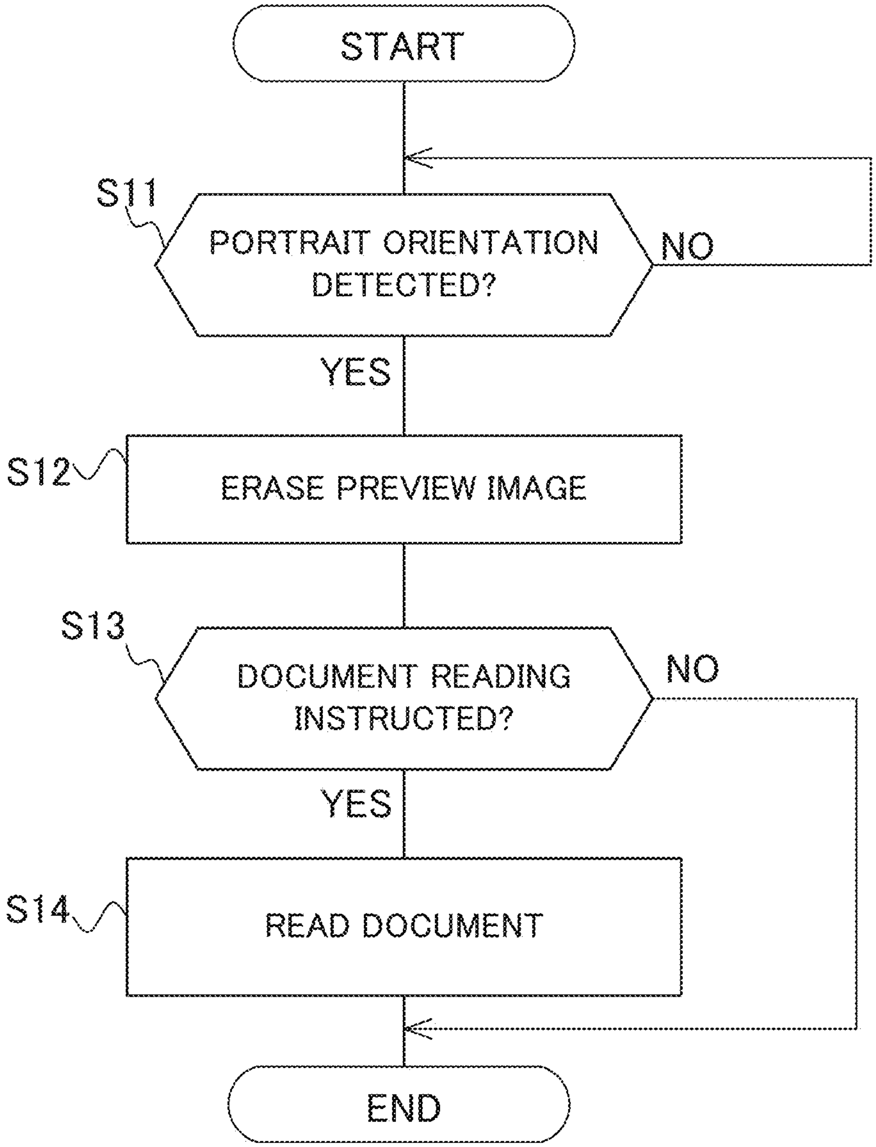
FIG. 13 is a flowchart showing a display control process according to a second embodiment, performed by the controller in relation with the variation in posture of the display device.

Hereunder, a display control process according to a second embodiment, performed by the controller 100 in relation with the transition in posture of the display device 473, will be described. FIG. 13 is a flowchart showing the display control process according to the second embodiment, performed by the controller 100 in relation with the transition in posture of the display device 473.

When the user shifts the display device 473 from the landscape orientation to the portrait orientation, to thereby confirm the second preview screen PS2 (FIG. 8), it can be assumed that the user visually checks the preview image PV1 displayed in the enlarged size in the second preview screen PS2, and inputs, provided that the content of the preview image PV1 is satisfactory, the resumption instruction to the operation device 47, when the display device 473 is displaying the second preview screen PS2 in the portrait orientation. It can also be assumed that, in the case where the user decides that the content of the preview image PV1 is defective, the user inputs the suspension instruction to the operation device 47, when the display device 473 is displaying the second preview screen PS2 in the portrait orientation.

Therefore, when the user inputs neither of the resumption instruction and the suspension instruction to the operation device 47, it can be assumed that user is not intending to execute the remaining operation of the job already scheduled, with respect to the document image, acquired through the document reading operation and displayed as the preview image, but intending to again cause the document reading device 5 to execute the document reading operation, and execute the remaining operation of the job, with respect to the document image, acquired through the newly executed document reading operation.

In the second embodiment, therefore, when the sensor 476 detects the transition in posture of the display device 473 from the portrait orientation to the landscape orientation (YES at S11), in the state where the second preview screen PS2 is displayed on the display device 473 in the portrait orientation, and the job scheduled with respect to the image data corresponding to the second preview screen PS2 is temporarily suspended, the controller 100 erases the display of the second preview screen PS2 and the preview image PV1, thus far displayed on the display device 473 (S12). At this point, the controller 100 displays, for example, the operation screen SC2 shown in FIG. 6B on the display device 473, instead of the second preview screen PS2.

Thereafter, the controller 100 stands by for the instruction to cause the document reading device 5 to again read the document, to be inputted to the operation device 47 (S13), and when the operation device 47 receives such instruction (YES at S13), the controller 100 causes the document reading device 5 to again read the document (S14), and continue with the job.

Here, after S12, the controller 100 may save the document image already acquired through the document reading operation, and stand by for the input of the setting for the image forming operation with respect to the document image. Then, when the operation device 47 receives the instruction indicating the setting for the image forming operation with respect to the document image, the controller 100 may cause the image forming device 12 to execute the image forming operation with respect to the document data, according to the setting indicated by the instruction.

Thus, the message urging the user to input either the resumption instruction or the suspension instruction of the job is not displayed in the second embodiment, unlike in the first embodiment. Therefore, the operation useful to the user in setting up the job, is executed in linkage with the user's action for shifting the display device 473 from the portrait orientation, in which the second preview screen PS2 is displayed, to the landscape orientation, without standing by for the user's input of the instruction. Such an arrangement improves the convenience in operation for the user.

Here, also in the case where the display device 473 is displaying, as result of the transition in posture, the second preview screen PS2 and the preview image PV1 in the portrait orientation, on the basis of the image data representing the document data stored in the document box, when the sensor 476 detects the transition in posture of the display device 473 from the portrait orientation to the landscape orientation, in the state where the job scheduled with respect to the image data corresponding to the second preview screen PS2 is temporarily suspended, the controller 100 erases the second preview screen PS2 and the preview image PV1, thus far displayed on the display device 473. In this case, the controller 100 displays the list L1 of the documents represented by the document data stored in the document box, as shown in FIG. 12, on the display device 473, instead of the second preview screen PS2.

The existing image forming apparatuses also include those configured to display the preview image on the display device, to present in advance the finish quality of the printed material. In addition, when the display device is shifted to the landscape orientation, after the user has confirmed the preview image on the display device set to the portrait orientation, in most cases the user proceeds to the setting of the next operation to be executed with respect to the preview image. Accordingly, if the operation useful for the setting for the operation to be executed next can be provided, in linkage with the user's action to set the display device to the landscape orientation, without standing by for the instruction from the user, the convenience in operation for the user can be improved. However, the existing image forming apparatuses are, unlike in the foregoing embodiments, not configured to execute the mentioned operation, in linkage with the user's action to set the display device to the landscape orientation.

In contrast, according to the foregoing embodiments, the operation useful for improving the user-friendliness of the apparatus can be executed, in linkage with the user's action to shift the posture of the display device 473.

The information processing apparatus according to another embodiment of the disclosure is, for example, a personal computer or the like, and at least includes the operation device 47, the display device 473, the rotary mechanism 474, the sensor 476, and the controller 100. It is not mandatory for the information processing apparatus according to this embodiment, to include the image forming device 12. In the case of the information processing apparatus according to this embodiment also, when the controller 100 displays the image data stored in a built-in memory unit or HDD on the display device 473, the controller 100 executes the display control as described above, in relation with the transition in posture of the display device 473. In this case, naturally, the operation related to the image forming operation is not executed.

The disclosure may be modified in various manners, without limitation to the foregoing embodiments. For example, according to the first embodiment, upon deciding that the sensor 476 has detected the transition in posture of the display device 473 from the portrait orientation to the landscape orientation (YES at S1), and that the second preview screen PS2 was displayed on the display device 473 in the portrait orientation (YES at S2), the controller 100 displays the dialog box DX1 shown in FIG. 10, on the display device 473 (S3). In this case, the controller 100 may further erase the second preview screen PS2 and the preview image PV1, thus far displayed on the display device 473, at the same time as displaying the dialog box DX1.

Further, the configurations and processings described in the foregoing embodiments with reference to FIG. 1 to FIG. 13 are merely exemplary, and in no way intended to limit the disclosure to those configurations and processings.

While the present disclosure has been described in detail with reference to the embodiments thereof, it would be apparent to those skilled in the art that the various changes and modifications may be made therein within the scope defined by the appended claims.

What is claimed is:

1. An information processing apparatus comprising:

an operation device that receives an instruction inputted by a user;

a display device having a rectangular shape including long sides and short sides;

a rotary mechanism that allows the display device to rotate between a landscape orientation in which the long sides are opposed in an up-down direction, and a portrait orientation in which the short sides are opposed in the up-down direction;

a sensor that detects which of the landscape orientation and the portrait orientation the display device is assuming; and a control device including a processor, and configured to act, when the processor executes a control program, as a controller that:

displays, on the display device, a first preview screen including a preview image display region for displaying a preview image of an image represented by image data and a plurality of first operation keys related to a display form of the preview image, and displays the preview image in the preview image display region, such that edges of the preview image opposed in the up-down direction become parallel to the long side of the display device, when the landscape orientation of the display device is detected by the sensor;

displays a second preview screen, in which the preview image display region has been expanded, on the display device, the second preview screen including a plurality of second operation keys related to a display form of the preview image and disposed at a position that does not overlap with the expanded preview image display region, when the sensor detects that the display device has been shifted from the landscape orientation to the portrait orientation, in a state where the first preview screen is displayed on the display device, and displays the preview image in an enlarged size in accordance with the expansion, such that the edges of the preview image opposed in the up-down direction become parallel to the short side of the display device;

displays, when the sensor detects that the display device has been shifted from the portrait orientation to the landscape orientation, in a state where the second preview screen is displayed on the display device, and a job assigned with respect to the image data corresponding to the preview image is temporarily suspended, a message urging the user to input an instruction on whether to resume the job;

resumes the job when the operation device receives a resumption instruction to resume the job; and keeps from resuming the job when the operation device receives a suspension instruction restricting resumption of the job.

2. The information processing apparatus according to claim 1, wherein, when the sensor detects that the display device has been shifted from the portrait orientation to the landscape orientation, in the state where the second preview screen is displayed on the display device, and the job assigned with respect to the image data corresponding to the preview image is temporarily suspended, the controller displays the message on the display device, and erases the preview image on the display device.

3. The information processing apparatus according to claim 1, further comprising a storage device containing a document box for storing therein document data, wherein, in a case where the operation device receives a suspension instruction for restricting execution of the job, when the message is displayed on the display device, the controller erases the preview image on the display device, and when the image data associated with the preview image represents the document data stored in the document box, the controller displays a list of the document data stored in the document box, on the display device.

4. An image forming apparatus comprising:

the information processing apparatus according to claim 1; and an image forming device that forms an image on a recording medium, wherein the controller causes the display device to display a preview image representing the image to be formed by the image forming device.

5. An information processing apparatus comprising:

an operation device that receives an instruction inputted by a user;

a display device having a rectangular shape including long sides and short sides;

a rotary mechanism that allows the display device to rotate between a landscape orientation in which the long sides are opposed in an up-down direction, and a portrait orientation in which the short sides are opposed in the up-down direction;

a sensor that detects which of the landscape orientation and the portrait orientation the display device is assuming; and a control device including a processor, and configured to act, when the processor executes a control program, as a controller that:

displays, on the display device, a first preview screen including a preview image display region for displaying a preview image of an image represented by image data, and displays the preview image in the preview image display region, such that edges of the preview image opposed in the up-down direction become parallel to the long side of the display device, when the landscape orientation of the display device is detected by the sensor;

displays a second preview screen, in which the preview image display region has been expanded, on the display device, when the sensor detects that the display device has been shifted from the landscape orientation to the portrait orientation, in the state where the first preview screen is displayed on the display device, and displays the preview image in an enlarged size in accordance with the expansion, such that the edges of the preview image opposed in the up-down direction become parallel to the short side of the display device;

erases the preview image on the display device, when the sensor detects that the display device, displaying the second preview screen, has been shifted from the portrait orientation to the landscape orientation, in a state where a job assigned with respect to the image data corresponding to the preview image is temporarily suspended.

6. The information processing apparatus according to claim 5, wherein, when the controller erases the preview image on the display device, because the sensor has detected that the display device has been shifted from the portrait orientation to the landscape orientation, in the state where the job assigned with respect to the image data corresponding to the preview image is temporarily suspended, the controller displays an operation screen for receiving an instruction from the user, on the display device.

* * * * *